United States Patent [19]

Bonnville

[11] Patent Number: 5,741,026
[45] Date of Patent: Apr. 21, 1998

[54] CONNECTING AND SUPPORTING STRUCTURE FOR VEHICLE FRAME ASSEMBLY

[75] Inventor: Kenneth J. Bonnville, Fleetwood, Pa.

[73] Assignee: Dana Corporation, Toledo, Ohio

[21] Appl. No.: 656,368

[22] Filed: May 31, 1996

[51] Int. Cl.⁶ .................................................. B62D 21/00
[52] U.S. Cl. .............................. 280/781; 280/788; 280/790
[58] Field of Search .................................. 280/787, 788, 280/790

[56] References Cited

U.S. PATENT DOCUMENTS

| | | | |
|---|---|---|---|
| 1,491,563 | 4/1924 | Stresau | 280/800 |
| 1,547,263 | 7/1925 | Pomeroy | 180/312 |
| 1,754,926 | 4/1930 | Andren | 280/800 |
| 1,808,502 | 6/1931 | Ledwinka | 280/790 |
| 2,705,660 | 5/1955 | Giacosa | 296/204 |
| 2,711,340 | 6/1955 | Lindsay | 296/204 |
| 3,089,559 | 5/1963 | Rieck | 180/292 |
| 3,580,611 | 5/1971 | McNitt | 280/433 |
| 3,614,124 | 10/1971 | Schwabenlender | 280/788 |
| 4,147,379 | 4/1979 | Winslow | 280/781 |
| 4,386,792 | 6/1983 | Moore et al. | 280/781 |
| 4,618,163 | 10/1986 | Hasler | 280/785 |
| 4,813,704 | 3/1989 | Smith | 200/692 |
| 5,149,132 | 9/1992 | Ruehl et al. | 280/800 |
| 5,320,403 | 6/1994 | Kazyak | 296/203 |

FOREIGN PATENT DOCUMENTS

| | | |
|---|---|---|
| 752506 | 7/1956 | United Kingdom . |
| 932415 | 7/1963 | United Kingdom . |
| 2225986 | 6/1990 | United Kingdom . |

*Primary Examiner*—Kenneth R. Rice
*Attorney, Agent, or Firm*—MacMillan, Sobanski & Todd

[57] ABSTRACT

A connecting and supporting structure is adapted for use in a vehicle frame assembly. The structure is a one-piece body preferably formed of cast aluminum alloy. The body includes a first joining portion adapted for connection to a first side rail section, and a second joining portion adapted for connection to a second side rail section. Preferably the first joining portion is formed on a first end of the body having a first height, and the second joining portion is formed on a second end of the body having a second height which is different from the first height. The body further includes a supporting portion which is preferably a spring hanger adapted for supporting a vehicle spring.

32 Claims, 4 Drawing Sheets

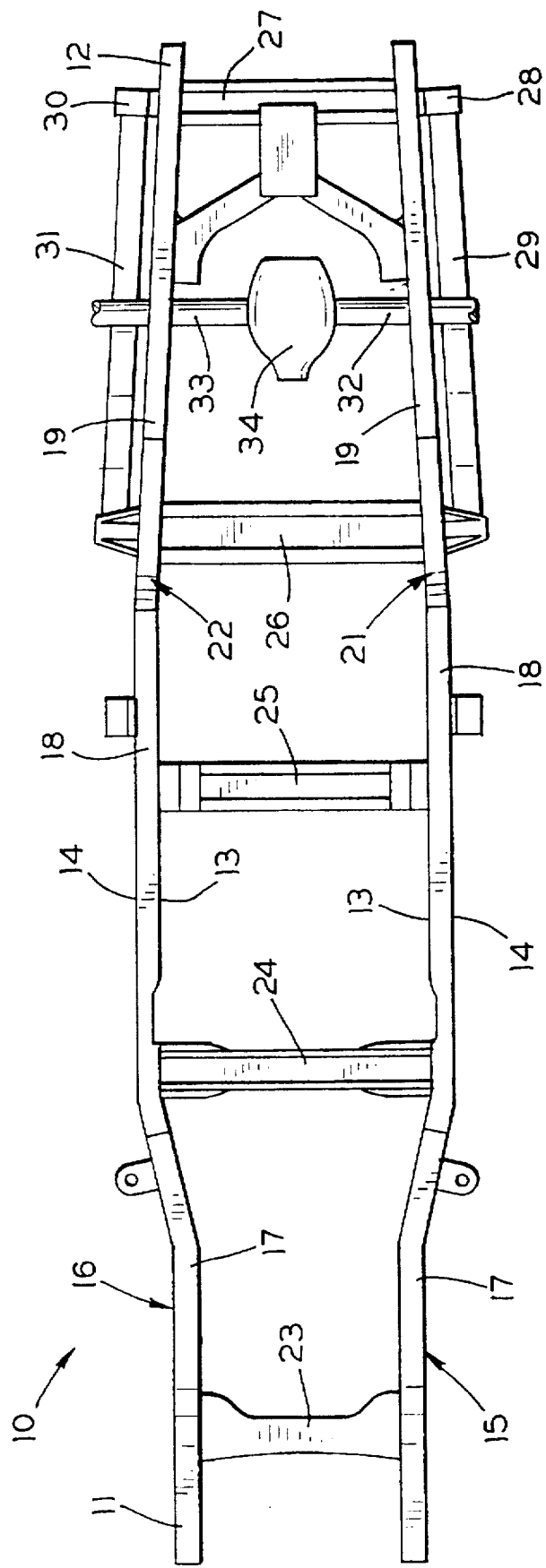
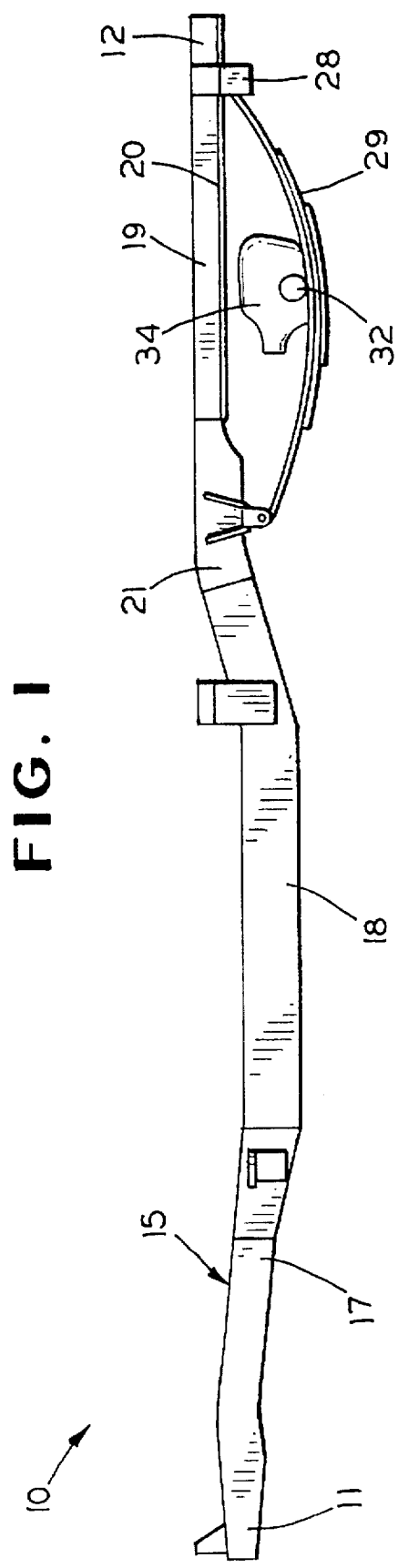
FIG. 1
FIG. 2

CONNECTING AND SUPPORTING STRUCTURE FOR VEHICLE FRAME ASSEMBLY

BACKGROUND OF THE INVENTION

This invention relates in general to vehicle frame assemblies, and in particular to a cast aluminum connecting and supporting structure adapted for use in an aluminum vehicle frame assembly.

A vehicle such as a light truck includes a vehicle frame assembly which serves as a platform for the other major structural components of the vehicle. The body and engine of the vehicle are mounted on top of the vehicle frame assembly, and the drive train and suspension system are hung underneath it. The vehicle frame assembly includes various supporting structures for connection to other vehicle components. For example, the vehicle frame assembly of a light truck is usually provided with spring hangers for supporting the leaf springs of the rear suspension system. The leaf springs are connected between the rear axles of the vehicle and the vehicle frame assembly to improve the ride of the vehicle.

The vehicle frame assembly includes a pair of elongated, parallel side rails, and a plurality of cross members extending between the side rails to connect them together. In the past, the side rails of a vehicle such as a light truck were often continuous, one-piece members. The supporting structures were usually separate parts which were attached to the side rails by riveting. One-piece side rails are relatively difficult and expensive to manufacture and transport because of their great length and weight. Also, different portions of the one-piece side rails cannot easily be designed with different heights to support different loads along the length of the side rails. Thus, it would be desirable to provide supporting structures for a vehicle frame assembly that enable the use of multi-section side rails instead of one-piece side rails.

The side rails, cross members and supporting structures of the vehicle frame assembly have usually been formed of steel. Such steel components are relatively heavy and, therefore, undesirably add weight to the vehicle. Accordingly, it would also be desirable to provide supporting structures for a vehicle frame assembly that are formed of a lightweight material such as aluminum alloy, and that enable the use of side rails and cross members formed of aluminum alloy.

SUMMARY OF THE INVENTION

This invention relates to a connecting and supporting structure adapted for use in a vehicle frame assembly. The structure comprises a one-piece body preferably formed of cast aluminum alloy. The body includes a first joining portion adapted for connection to a first side rail section, and a second joining portion adapted for connection to a second side rail section. Preferably the first joining portion is formed on a first end of the body having a first height, and the second joining portion is formed on a second end of the body having a second height which is different from the first height. The first and second joining portions are preferably C-shaped protrusions formed on the opposing ends of the body. The body further includes a supporting portion which is preferably a spring hanger adapted for supporting a leaf spring of the vehicle. Preferably the body also includes a cross member attachment portion adapted for connection to a cross member of the vehicle frame assembly.

Various objects and advantages of this invention will become apparent to those skilled in the art from the following detailed description of the preferred embodiment, when read in light of the accompanying drawings.

BRIEF DESCRIPTION OF THE DRAWINGS

FIG. 1 is a top plan view of a vehicle frame assembly including left and right connecting and supporting structures in accordance with this invention.

FIG. 2 is a side elevational view of the left side of the vehicle frame assembly illustrated in FIG. 1.

DETAILED DESCRIPTION OF THE PREFERRED EMBODIMENT

Figure 3:
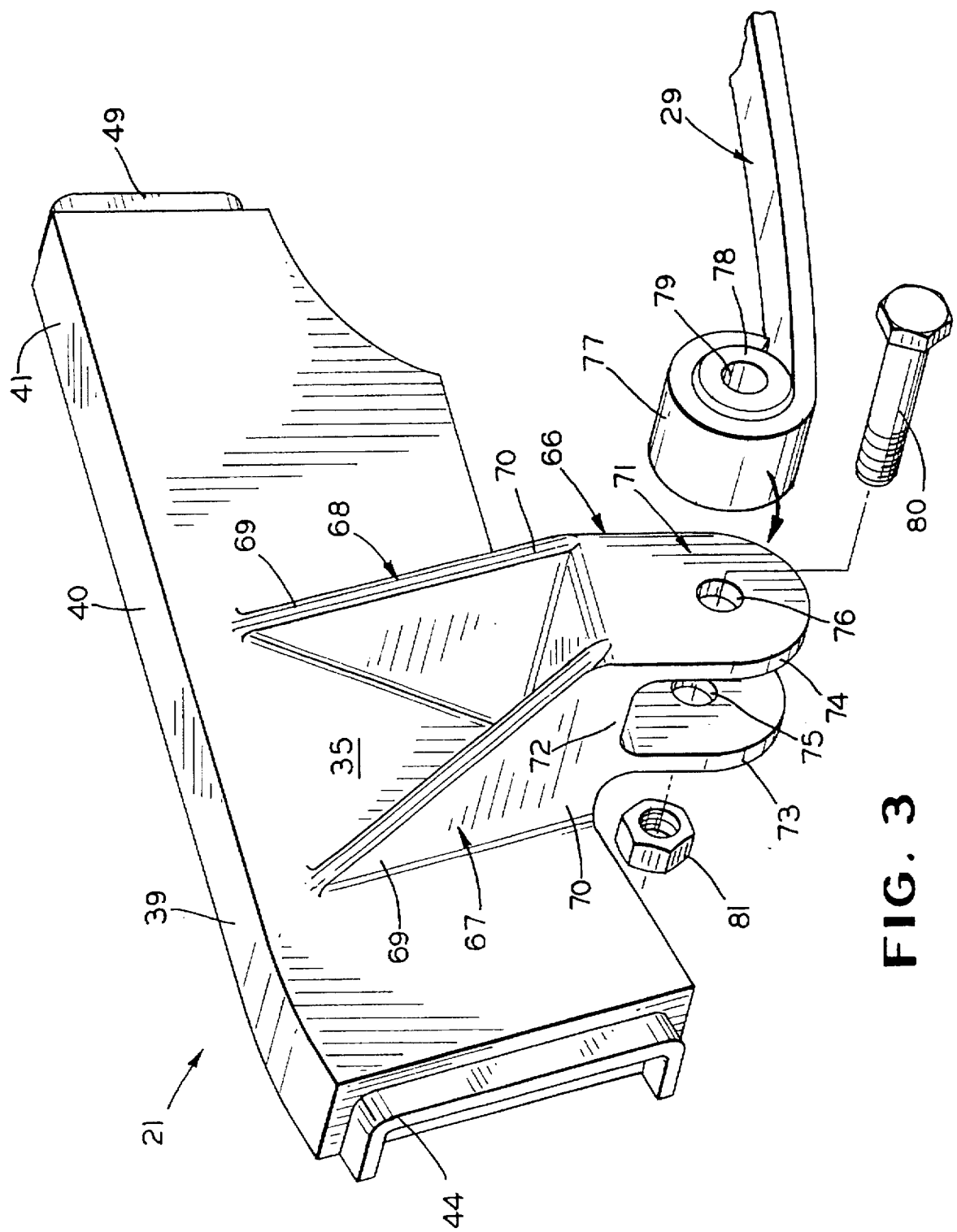
FIG. 3 is a perspective view of the outer portions of the left connecting and supporting structure illustrated in FIGS. 1 and 2 showing a leaf spring to be secured thereto.

Referring now to the drawings, there is illustrated in FIGS. 1 and 2 a vehicle frame assembly indicated generally at 10. Preferably the vehicle frame assembly is formed of a lightweight material such as aluminum alloy. The vehicle frame assembly 10 has a front end 11, a rear end 12, an inner side 13 and an outer side 14.

The vehicle frame assembly 10 includes two longitudinally extending side rails, a left side rail 15 and a right side rail 16. The side rails 15, 16 are shaped as elongated beams which are spaced apart and generally parallel with one another. The side rails 15, 16 are not continuous one-piece members, but rather are comprised of three side rail sections: a front side rail section 17, a center side rail section 18, and a rear side rail section 19. Preferably the front side rail section 17 is formed with a box-shaped cross section, and the center and rear side rail sections 18, 19 are each formed with a generally C-shaped cross section. The rear side rail section 19 also has a downwardly extending lip 20. As will be discussed below, the rear side rail section 19 has a smaller height than the center side rail section 18.

A first connecting and supporting structure 21 in accordance with this invention is secured between the center side rail section 18 and the rear side rail section 19 of the left side rail 15. A second connecting and supporting structure 22 is secured between the center side rail section 18 and the rear side rail section 19 of the right side rail 16. The first and second connecting and supporting structures 21, 22 are described in more detail below.

A plurality of cross members 23 through 27 extend laterally between the side rails 15, 16 to connect them together. The cross members 23 through 27 are shaped as short beams which are spaced apart and generally parallel with one another, and generally perpendicular to the side rails 15, 16. The ends of each cross member are secured to the side rails 15, 16 by welding, riveting, bolting or other suitable means. One cross member 26 is secured between the first and second connecting and supporting structures 21, 22 of this invention. The cross member 26 is preferably positioned to support the fuel tank of the vehicle, but it can also serve a different function.

A left rear spring hanger 28 is riveted to the rear end 12 of the left side rail 15. A left rear leaf spring 29 is supported by the vehicle frame assembly between the left rear spring hanger 28 and the first connecting and supporting structure 21. Similarly, a right rear spring hanger 30 is riveted to the rear end 12 of the right side rail 16. A right rear leaf spring 31 is supported by the vehicle frame assembly between the right rear spring hanger 30 and the second connecting and supporting structure 22. The leaf springs 29, 31 are provided to connect the vehicle frame assembly 10 to the left rear axle 32 and right rear axle 33, respectively, of the vehicle drive train. The left and right rear axles 32, 33 are connected by a differential 34 to a drive shaft (not shown) connected to the engine to rotatably drive the wheels of the vehicle. The leaf springs 29, 31 along with a pair of shock absorbers (not shown) improve the ride of the vehicle by providing a cushion between the wheels and the vehicle frame assembly.

Figure 4:
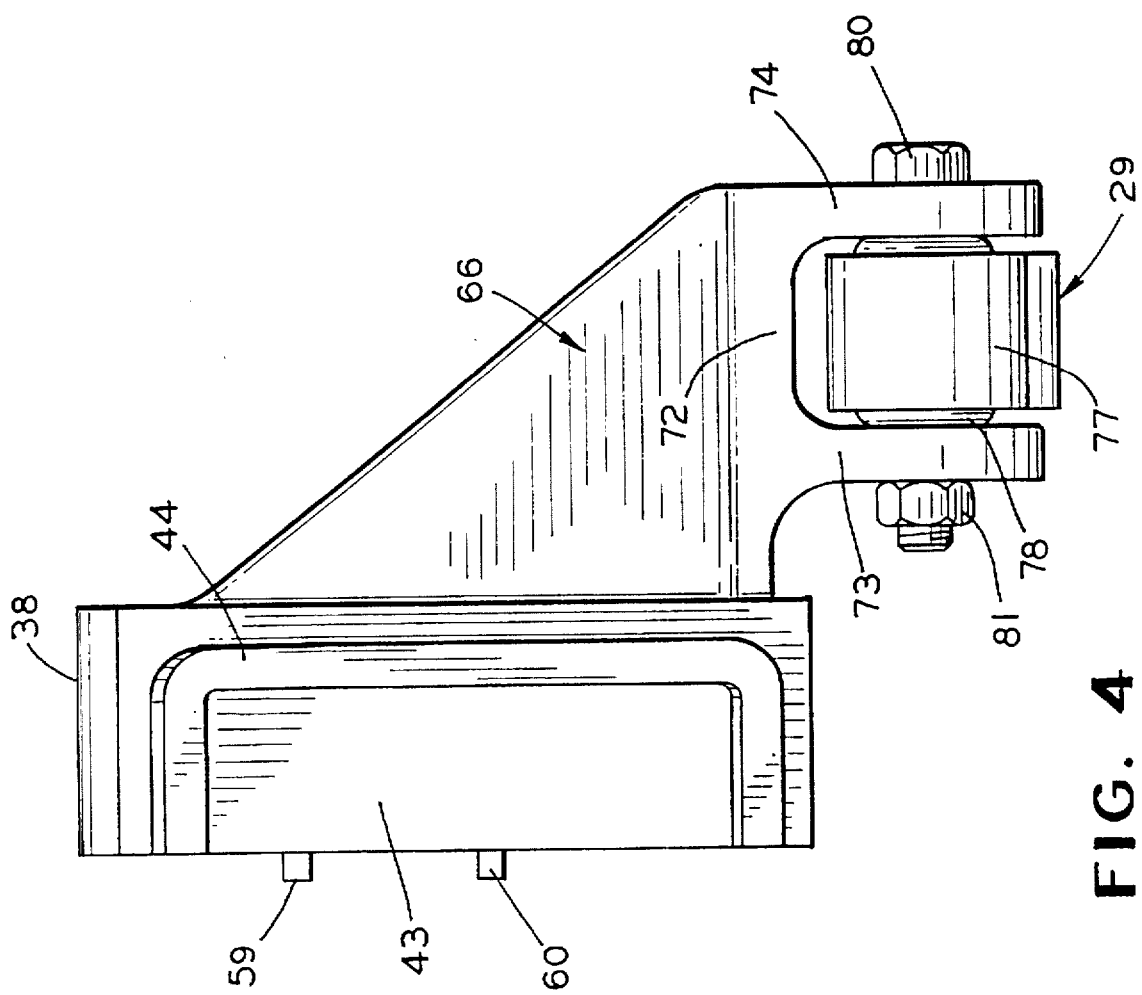
FIG. 4 is a front elevational view of the left connecting and supporting structure illustrated in FIGS. 1 through 4 showing the leaf spring secured thereto.
Figure 5:
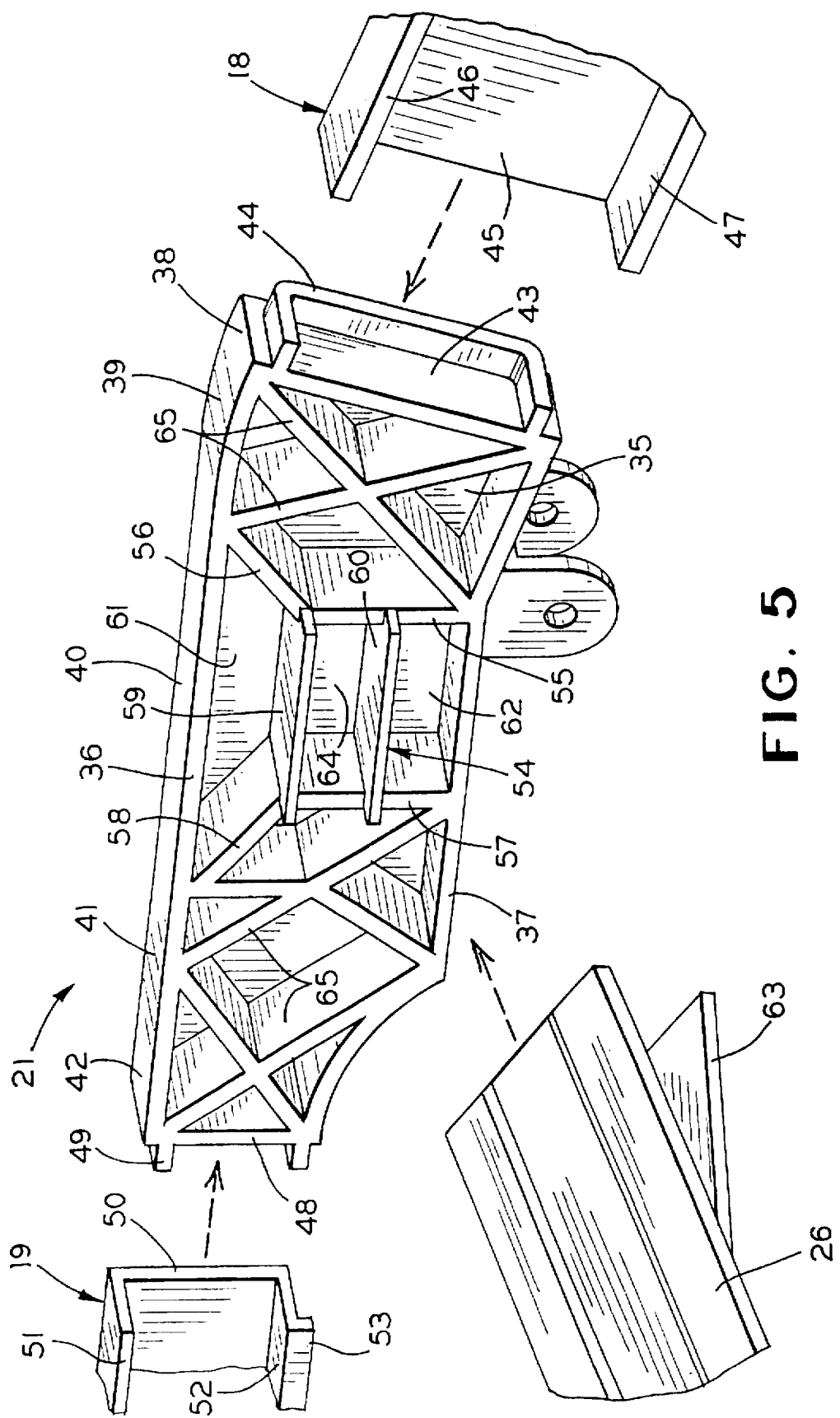
FIG. 5 is a perspective view of the inner portions of the left connecting and supporting structure illustrated in FIGS. 1 through 4 showing a pair of side rail sections and a cross member to be secured thereto.

Referring now to FIGS. 3 through 5, the first connecting and supporting structure 21 in accordance with this invention is illustrated in more detail. The first connecting and supporting structure 21 is essentially the mirror image of the second connecting and supporting structure 22. Accordingly, the following description will be applicable to both structures. The connecting and supporting structure 21 is particularly adapted for use in an aluminum vehicle frame assembly such as shown in FIGS. 1 and 2, but it can also be used in other kinds of vehicle frame assemblies.

The connecting and supporting structure 21 comprises an elongated, one-piece body which is preferably formed by casting a lightweight material such as aluminum alloy. The body includes a web 35 which extends vertically and longitudinally. An upper flange 36 extends horizontally inward from the upper edge of the web 35. A lower flange 37 extends horizontally inward from the lower edge of the web 35. The web 35, upper flange 36 and lower flange 37 define a generally C-shaped cross section.

The body of the connecting and supporting structure 21 includes a front end 38, a front portion 39, a center portion 40, a rear portion 41, and a rear end 42. The front portion 39 of the body tapers to an increased height compared to the center portion 40. In this manner, the front end 38 of the body is adapted for joining with the center side rail section 18 having the same increased height. The front portion 39 of the body also angles downwardly and is curved slightly outwardly for joining with the center side rail section 18.

A closed front end surface 43 is formed on the front end 38 of the body. The front end surface 43 extends laterally between the web 35, upper flange 36 and lower flange 37. A first joining portion, known as a front side rail attachment 44, is formed integrally with the front end surface 43. The front side rail attachment 44 is in the form of a generally C-shaped protrusion which extends forwardly from the body of the connecting and supporting structure 21. The attachment 44 has the same general shape and orientation as the C-shaped cross section of the front end 38 of the body of the connecting and supporting structure 21. However, the protrusion is somewhat smaller than the cross section of the body of the connecting and supporting structure 21, so that the outer diameter of the protrusion is approximately the same as the inner diameter of the front end 38 of the body.

The front side rail attachment 44 is adapted to receive thereon the center side rail section 18 for securement to the connecting and supporting structure 21. The center side rail section 18 has a vertically extending web 45 and upper and lower flanges 46, 47 defining a generally C-shaped cross section. The end of the center side rail section 18 is positioned on the front side rail attachment 44 such that the web 45, upper flange 46 and lower flange 47 of the center side rail section 18 are positioned, respectively, against the web 35, upper flange 36 and lower flange 37 of the connecting and supporting structure 21. The center side rail section 18 is then secured to the connecting and supporting structure 21 in any suitable manner, and preferably by welding.

The rear portion 41 of the body of the connecting and supporting structure 21 tapers to a reduced height compared to the center portion 40. Specifically, the lower portion of the web 35 and the lower flange 37 are tapered upwardly in the rear portion 41 of the body. In this manner, the rear end 42 of the body is adapted for joining with the rear side rail section 19 having the same reduced height.

A closed rear end surface 48 is formed on the rear end 42 of the body. The rear end surface 48 extends laterally between the web 35, upper flange 36 and lower flange 37. A second joining portion, known as a rear side rail attachment 49, is formed integrally with the rear end surface 48. The rear side rail attachment 49 is in the form of a generally C-shaped protrusion which extends rearwardly from the body of the connecting and supporting structure 21. The attachment 49 has the same general shape and orientation as the C-shaped cross section of the rear end 42 of the body of the connecting and supporting structure 21. However, the attachment 49 is somewhat smaller than the cross section of the body of the connecting and supporting structure 21, so that the outer diameter of the protrusion is approximately the same as the inner diameter of the rear end 42 of the body.

The rear side rail attachment 49 is adapted to receive thereon the rear side rail section 19 for securement to the connecting and supporting structure 21. The rear side rail section 19 has a vertically extending web 50, horizontally extending upper and lower flanges 51, 52, and a lip 53 extending vertically downward from the lower flange 52. The web 50 and upper and lower flanges 51, 52 define a generally C-shaped cross section. The end of the rear side rail section 19 is positioned on the rear side rail attachment 49 such that the web 50, upper flange 51 and lower flange 52 of the rear side rail section 19 are positioned, respectively, against the web 35, upper flange 36 and lower flange 37 of the connecting and supporting structure 21. The rear side rail section 19 is then secured to the connecting and supporting structure 21 in any suitable manner, and preferably by welding.

Thus, the illustrated front and rear side rail attachments 44, 49 are adapted for joining with side rail sections 18, 19 having a generally C-shaped cross section. Alternatively, the front and rear side rail attachments 44, 49 are also adapted for joining with side rail sections having a box-shaped cross section. The front and rear side rail attachments 44, 49 can be formed with other shapes for joining other types of side rail structures.

The connecting and supporting structure 21 further includes a cross member attachment portion 54 formed integrally with the web 35 and upper and lower flanges 36, 37 in the center portion 40 of the body. The cross member attachment portion 54 includes a vertically extending lower front wall 55, and a forwardly angled upper front wall 56. The cross member attachment portion 54 further includes a vertically extending lower rear wall 57, and a rearwardly angled upper rear wall 58. An upper shelf 59 and a lower shelf 60 extend horizontally between the lower front and rear walls 55, 57. The upper and lower shelves 59, 60 are generally planar and parallel with one another, and extend inwardly past the upper and lower flanges 36, 37 a short distance.

An upper pocket 61 is defined between the upper shelf 59, upper flange 36, and upper front and rear walls 56, 58. A cross member 26 with a hat-shaped cross section is inserted into the upper pocket 61 and secured thereto by welding, riveting, bolting or other suitable means. A lower pocket 62 is defined between the lower shelf 60, lower flange 37, and lower front and rear walls 55, 57. The cross member 26 has a supporting gusset 63 attached at its end and angled downwardly therefrom. The gusset 63 is inserted into the lower pocket 62 and secured thereto. The cross member attachment portion 54 is also useful for attaching other types of cross members with or without gussets. For example, a cross member with a box-shaped cross section could be secured in a center pocket 64 defined between the upper and lower shelves 59, 60 and the lower front and rear walls 55, 57.

The body of the connecting and supporting structure 21 has reinforcing ribs 65 extending between the upper and lower flanges 36, 37 and adjacent to the web 35. The structures of the cross member attachment portion 54 also function as reinforcing ribs.

As best shown in FIGS. 4 and 5, the body of the connecting and supporting structure 21 further includes a spring hanger 66 for supporting the front end of the rear leaf spring 29. The spring hanger 66 is formed integrally with the web 35 of the front portion 39 of the body, and it extends outwardly and downwardly therefrom. The spring hanger 66 includes a pair of reinforcing ribs 67, 68 which extend outwardly from the web 35. The reinforcing ribs 67, 68 are triangular in form, each having a narrow upper portion 69 and a wide lower portion 70. The upper portions 69 of the reinforcing ribs 67, 68 are angled slightly away from one another. This structure of the reinforcing ribs 67, 68 provides maximum support for the spring hanger 66 with minimum added weight. The lower portions 70 of the reinforcing ribs 67, 68 support a bracket 71 which is formed integrally therewith. The bracket 71 includes a horizontally extending base 72, and a pair of ears 73, 74 extending vertically downward from the ends of the base 72. The ears 73, 74 are generally parallel with one another and with the web 35. A pair of aligned apertures 75, 76 are formed through the ears 73, 74.

An eye 77 is formed on the front end of the rear leaf spring 29. A bushing 78 is secured inside the eye 77. The bushing 78 has an aperture 79 formed therethrough. To secure the rear leaf spring 29 to the spring hanger 66, the eye 77 of the rear leaf spring 29 is positioned inside the ears 73, 74 of the spring hanger 66. The aperture 79 through the bushing 78 is aligned with the apertures 75, 76 through the ears 73, 74. Then a fastener such as a bolt 80 is positioned through the apertures 75, 76 and secured thereto by a nut 81.

The one-piece body of the connecting and supporting structure can be formed by any conventional casting method. A preferred method is permanent mold casting by casting molten aluminum alloy in a metal mold. Other types of casting, such as sand casting, can also be used. Preferably, the connecting and supporting structure is formed of an aluminum alloy so that it is lightweight and strong. A preferred aluminum alloy is A 356 T6 which has desirable strength and rigidity properties. In addition to casting, other methods, such as forging, can also be used to form the one-piece body of the connecting and supporting structure.

The weight of the vehicle frame assembly is reduced by the use of the cast aluminum connecting and supporting structures. The connecting and supporting structures also facilitate the use of aluminum side rails and cross members. Aluminum vehicle frames are not usually found in light trucks.

The apertures 75, 76 in the spring hangers 66 of the first and second connecting and supporting structures 21, 22 are usually formed after casting, and are preferably formed after assembly. Thus, the positioning of the apertures 75, 76 can be fine adjusted during assembly of the vehicle for correct positioning of the leaf springs 29, 31 secured to the spring hangers 66.

The connecting and supporting structure of this invention facilitates the use of side rail sections designed with different heights. As described above, the rear side rail sections 19 have a smaller height than the center side rail sections 18 of the side rails. By way of background, the front cab of a vehicle such as a light truck is significantly heavier than the rear load box of the vehicle. As a result, the load on the vehicle frame assembly is reduced from the front end to the rear end of the assembly. Thus, the rear side rail sections 19 can be designed with a smaller height to save material, while still providing sufficient strength to support the load.

It should also be noted that the body of the connecting and supporting structure, and particularly the rear portion, can be designed with different lengths to accommodate different configurations of the vehicle. For example, the length can be shortened to accommodate a shorter rear load box on the vehicle.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope. For example, the connecting and supporting structure can be positioned at other locations in the vehicle frame assembly, and it can be constructed to support other vehicle components besides leaf springs.

What is claimed is:

1. A connecting and supporting structure adapted for use in a vehicle frame assembly comprising a one-piece body including:
   a first joining portion adapted for connection to a first vehicle frame section, a second joining portion adapted for connection to a second vehicle frame section, such that the body and the first and second vehicle frame sections are aligned, and a supporting portion adapted for supporting a vehicle component.

2. The connecting and supporting structure defined in claim 1 wherein the first joining portion is formed on a first end of the body having a first height, and the second joining portion is formed on a second end of the body having a second height which is different from the first height.

3. The connecting and supporting structure defined in claim 1 wherein the first and second vehicle frame sections are side rail sections.

4. The connecting and supporting structure defined in claim 1 wherein the body further includes a cross member attachment portion adapted for connection to a cross member of the vehicle frame assembly.

5. The connecting and supporting structure defined in claim 1 wherein the supporting portion is a spring hanger.

6. The connecting and supporting structure defined in claim 5 wherein the spring hanger includes a bracket defined by a base and a pair of spaced apart ears, and aligned apertures are formed through the ears.

7. The connecting and supporting structure defined in claim 6 wherein the bracket is supported on the body by a pair of triangular reinforcing ribs.

8. The connecting and supporting structure defined in claim 1 wherein the body is formed by casting.

9. The connecting and supporting structure defined in claim 8 wherein the body is formed by casting aluminum alloy.

10. A connecting and supporting structure adapted for use in a vehicle frame assembly comprising a one-piece body formed of cast aluminum alloy, the body including:

a first joining portion adapted for connection to a first side rail section, wherein the first joining portion is formed on a first end of the body having a first height, a second joining portion adapted for connection to a second side rail section, wherein the second joining portion is formed on a second end of the body having a second height which is different from the first height, a cross member attachment portion adapted for connection to a cross member of the vehicle frame assembly, and a spring hanger adapted for supporting a vehicle spring.

11. A vehicle frame assembly comprising:

a pair of elongated side rails which are spaced apart and parallel with one another, each of the side rails including first and second side rail sections, a plurality of cross members extending between the side rails to connect them together, and a pair of connecting and supporting structures, each connecting and supporting structure positioned between the first and second side rail sections, and each connecting and supporting structure comprising a one-piece body including:

a first joining portion adapted for connection to the first side rail section, a second joining portion adapted for connection to the second side rail section, and a supporting portion adapted for supporting a vehicle component.

12. The vehicle frame assembly defined in claim 11 wherein the first and second side rail sections have different heights.

13. The vehicle frame assembly defined in claim 11 wherein the supporting portion is a spring hanger adapted for supporting a vehicle spring.

14. A connecting and supporting structure adapted for use in a vehicle frame assembly comprising a one-piece body including:

a first joining portion adapted to receive a first vehicle frame side rail section thereon for securement to the body, a second joining portion adapted to receive a second vehicle frame side rail section thereon for securement to the body, and a supporting portion adapted for supporting a vehicle component.

15. The connecting and supporting structure defined in claim 14 wherein the first and second joining portions are protrusions.

16. The connecting and supporting structure defined in claim 15 wherein the protrusions are C-shaped.

17. The connecting and supporting structure defined in claim 14 wherein the first joining portion is formed on a first end of the body having a first height, and the second joining portion is formed on a second end of the body having a second height which is different from the first height.

18. The connecting and supporting structure defined in claim 14 wherein the body further includes a cross member attachment portion adapted for connection to a cross member of the vehicle frame assembly.

19. The connecting and supporting structure defined in claim 14 wherein the supporting portion is a spring hanger.

20. The connecting and supporting structure defined in claim 14 wherein the body is formed by casting aluminum alloy.

21. A connecting and supporting structure adapted for use in a vehicle frame assembly comprising a one-piece body including:

a vertically extending web having upper and lower edges, an upper flange extending horizontally from the upper edge of the web, a lower flange extending horizontally from the lower edge of the web in the same direction as the upper flange, a first joining portion adapted for connection to a first vehicle frame section, a second joining portion adapted for connection to a second vehicle frame section, a supporting portion adapted for supporting a vehicle component, and first and second end surfaces extending generally perpendicular to the web, wherein the first and second joining portions are formed, respectively, on the first and second end surfaces.

22. The connecting and supporting structure defined in claim 21 wherein the first joining portion is formed on a first end of the body having a first height, and the second joining portion is formed on a second end of the body having a second height which is different from the first height.

23. The connecting and supporting structure defined in claim 21 wherein the first and second vehicle frame sections are side rail sections.

24. The connecting and supporting structure defined in claim 21 wherein the body further includes a cross member attachment portion adapted for connection to a cross member of the vehicle frame assembly.

25. The connecting and supporting structure defined in claim 21 wherein the supporting portion is a spring hanger.

26. The connecting and supporting structure defined in claim 21 wherein the first and second joining portions are protrusions.

27. The connecting and supporting structure defined in claim 21 wherein the body is formed by casting aluminum alloy.

28. A connecting and supporting structure adapted for use in a vehicle frame assembly comprising a one-piece body including:

a first joining portion adapted for connection to a first vehicle frame section, a second joining portion adapted for connection to a second vehicle frame section, a supporting portion adapted for supporting a vehicle component, and a cross member attachment portion adapted for connection to a cross member of the vehicle frame assembly, wherein the cross member attachment portion includes a pair of horizontally extending plates positioned within the body.

29. A vehicle frame assembly comprising:

a pair of elongated side rails which are spaced apart and generally parallel with one another, each of the side rails including first and second side rail sections, a plurality of cross members extending between the side rails to connect them together, and a pair of connecting and supporting structures, each connecting and supporting structure positioned between the first and second side rail sections, and each connecting and supporting structure comprising a one-piece body including:

a first joining portion adapted for connection to the first side rail section, a second joining portion adapted for connection to the second side rail section, a supporting portion adapted for supporting a vehicle component, and a cross member attachment portion adapted for connection to one of the cross members.

30. The vehicle frame assembly defined in claim 29 wherein the first and second side rail sections have different heights.

31. The vehicle frame assembly defined in claim 29 wherein the supporting portion is a spring hanger adapted for supporting a vehicle spring.

32. The vehicle frame assembly defined in claim 29 wherein the side rails and connecting and supporting structures are formed of aluminum alloy.

* * * * *